May 15, 1962   A. DANCHUK   3,035,113
METHOD AND MEANS FOR TERMINATING BRAIDED INSULATION
AND SHIELDING OF A WIRE CABLE
Filed Dec. 7, 1959

BEFORE HEAT TREATING

AFTER HEAT TREATING

INVENTOR.
ALEX DANCHUK
BY Herbert L. Davis
ATTORNEY

3,035,113
METHOD AND MEANS FOR TERMINATING BRAIDED INSULATION AND SHIELDING OF A WIRE CABLE
Alex Danchuk, Livingston, N.J., assignor to The Bendix Corporation, a corporation of Delaware
Filed Dec. 7, 1959, Ser. No. 857,787
3 Claims. (Cl. 174—74)

The invention relates to a novel method and means for terminating braided insulation and metal shielding at an end of a wire cable for use in the assembly of subminiature electrical equipment.

In the assembly of such electrical equipment having minimum space requirements, it has been found that the smallest ferrules heretofore applied about electrical wire cable terminal ends were much too bulky and did not serve to satisfactorily hold the metal shield braid and insulating braid of the wire securely to the insulated conductor in the assembly of the end portions of the wire in the equipment.

An object of the invention therefore is to provide a novel method and means for terminating braided and shielded wire cable ends so that such wire ends may be extended into subminiature electrical connectors without restriction or interference from adjacent wires.

Another object of the invention is to provide a novel method of producing satisfactory shielded wire ends in which a short length of tubing or an inner sleeve of a thermotype plastic material and of a proper diameter is first tapered at one end and then slipped, with the tapered end first, over an insulated electrical conductor and under a metal braided shield of conventional type normally surrounding the insulated conductor; another short length of tubing or an outer sleeve of such thermotype plastic material and of slightly larger diameter is then slipped over the shielded wire end and about an end of the insulated braid of the wire so as to leave the terminal end of the wire conductor exposed; and thereafter the assembly is subject to a heat treatment at relatively high temperatures for a few seconds. The thermotype plastic tubes or inner and outer sleeves may be fabricated from an irradiated thermally-stabilized, polyethylene base material having the characteristic that when exposed to such high temperatures the inner sleeve rapidly shrinks down on the insulation of the wire, while the outer sleeve rapidly shrinks down on the insulating braid, shield braid and inner sleeve so as to effect a tight fit thereabout. There is thus formed a flexible wire terminal in which both the metal braided shielding as well as the insulated braid are securely crimped between the outer and inner sleeve by the shrinkage under the heat treatment of the thermotype plastic outer sleeve while the shrinkage of the inner sleeve about the insulation material surrounding the electrical conductor cooperates with the outer sleeve to secure the same thereto.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
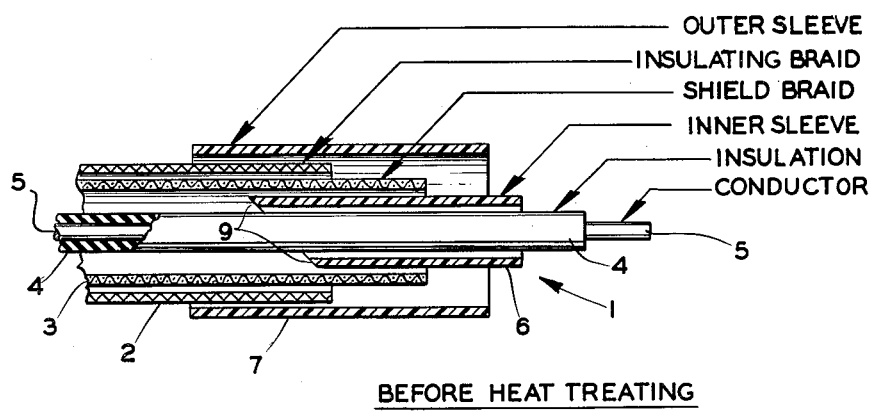
FIGURE 1 is a diagrammatic sectional view of a terminal end wire assembly to which outer and inner tubes or sleeves of a thermotype plastic material have been applied in accordance with the invention and showing the assembly thereof prior to the application of the heat treatment thereto.

Referring to the drawing of FIGURE 1, the invention may be applied to the terminal end of an electrical cable 1, including a conventional outer insulation braid 2, metal shield braid 3, and insulation coating 4 on an electrical conductor 5 in bonded relation thereto. In applying the invention, the insulation braid 2, metal shield braid 3, and insulation coating 4 are cut at the end of the cable 1 in step fashion so as to expose end portions of the conductor 5, insulation coating 4, shield braid 3, and insulation braid 2, as shown in FIGURE 1. There are further provided relatively short lengths of tubing or sleeves 6 and 7 of a thermotype plastic material such as may be fabricated from an irradiated, thermally-stabilized, polyethylene base material and commercially available under the name "Thermofit" of the Raytherm Corporation. The sleeve 7 may be of slightly larger diameter than the sleeve 6 and the sleeves 6 and 7 may be slipped over the terminal end of the electrical cable 1 as inner and outer sleeves respectively, as hereinafter explained.

The thermotype plastic inner sleeve 6 may be cut or formed with a tapered end 9 and slipped, with the tapered end 9 first, over the conductor 5 and insulation coating 4 so as to fit loosely on the insulation coating 4 formed tightly around the wire or electrical conductor 5 and under the braided metal shield 3 with a portion of the outer end of the sleeve 6 being exposed between the insulation coating 4 and the braided shield 3. The braided shield 3 is in turn surrounded by the insulation braid 2 to form in a conventional manner successive layers about the conductor 5 and insulation 4. The insulation coating 4 may be formed of a suitable plastic material such as polytetrafluoroethylene resin or "Teflon" and has a diameter slightly less than that of the sleeve 6, as initially placed on the insulation coating 4, and shown diagrammatically by FIGURE 1.

There is further provided the thermotype plastic outer sleeve 7 which is of a larger diameter than the sleeve 6 and of a sufficient diameter to permit the outer sleeve 7 to pass over exposed end portions of the inner sleeve 6, shield braid 3 and onto the outer insulation braid 2. The outer sleeve 7 is then slipped over the insulation braid 2 and inner sleeve 6 up to a point past that of the tapered end and outer end respectively of the inner sleeve 6. The sleeve 6, as previously explained, had been slipped between the metal shield braid 3 and the insulation 4, over the insulation coating 4 surrounding the wire or electrical conductor 5, and past the outer end of the coating 4.

The material of the thermotype plastic sleeves 6 and 7 is such that it may be slipped in an expanded form over the insulation coating 4 and insulation braid 3, respectively, of the cable 1, while retaining the characteristic common to such thermotype plastic material that when exposed for a few seconds to a relatively high activating temperature, of for example approximately 275° F., the sleeves 6 and 7 shrink down circumferentially to form a tight mechanical bond with the object over which it has been placed, while retaining its original length. To obtain a tight fit, the sizes of the thermotype plastic sleeve 6 and 7 are so selected as to have a maximum recovered diameter after the application of the activating temperature of slightly less than the diameter of the insulation coating 4 and insulation braid 3, respectively, at the terminal end of the cable 1.

Figure 2:
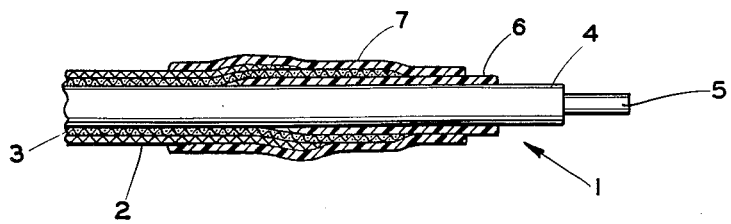
FIGURE 2 is a diagrammatic sectional view of the terminal end wire assembly of FIGURE 1 after the application of the heat treatment thereto in accordance with the invention.

The assembly of the terminal end of the wire cable 1 with the inner and outer sleeves 6 and 7 of thermotype plastic material, as shown in FIGURE 1, is then exposed to the relatively high activating temperature, of for example approximately 275° F., such as to cause the sleeves 6 and 7 to be constricted circumferentially to form a tight mechanical bond in which the inner sleeve 6 is tightly bonded to the insulation coating 4, while the outer sleeve 7 is contracted circumferentially so as to tightly bond the insulation braid 2 and metal shield braid 3 between the constricted outer sleeve 7 and inner sleeve 6, while bonding an end portion of the outer sleeve 7 to an exposed outer end portion of the constricted inner sleeve 6, as shown schematically in FIGURE 2.

The terminal end thus effected, presents a cable 1 with a flexible tightly bonded terminal end and an insulated and shielded terminal end of reduced diameter such that the terminal end of the shielded cable 1 may be extended into a connector of subminiature electrical equipment having minimum space requirements without restrictions or interference with adjacent wires.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a method for terminating an outer braided electrical insulation and a braided metal shielding of an insulated electrical conductor, the outer braided insulation surrounding the braided metal shielding, and the braided metal shielding surrounding the insulated electrical conductor; the steps comprising providing an inner sleeve and an outer sleeve of a thermotype plastic material; positioning the inner sleeve about the insulated electrical conductor and between the insulated electrical conductor and the braided metal shielding; positioning the outer sleeve about the outer braided insulation and exposed ends of the braided metal shielding and inner sleeve; exposing the outer and inner sleeves of said thermotype plastic material to a relatively high activating temperature so as to cause the outer and inner sleeves to shrink circumferentially so that the inner sleeve effects a tight mechanical bond with the insulated electrical conductor and the outer sleeve effects a tight mechanical bond with the outer braided insulation and exposed end portions of the braided metal shielding and inner sleeve.

2. In a method for terminating an electrical cable having an outer electrical insulation braid, a metal shielding braid, and an insulation coating about an electrical conductor, the outer insulation braid surrounding the metal shielding braid, and the metal shielding braid surrounding the insulation coating; the steps comprising providing an inner sleeve and an outer sleeve of a thermotype plastic fabricated from an irradiated, thermally-stabilized, polyethylene base material; positioning the inner sleeve about the insulation coating and between the insulation coating and the metal shielding braid; exposing end portions of the inner sleeve and the metal shielding braid and positioning the outer sleeve about the outer insulation braid and the exposed end portions of the inner sleeve and the metal shielding braid; exposing the outer and inner sleeves of said thermotype plastic material to a relatively high activating temperature so as to cause the outer and inner sleeves to shrink circumferentially so that the inner sleeve effects a tight mechanical bond with the insulation coating and the outer sleeve effects a tight mechanical bond with the outer insulation braid and exposed end portions of the inner sleeve and metal shielding braid so as to provide a flexible and a tightly bonded terminal end for the cable.

3. In a device for terminating an electrical cable having an outer electrical insulating braid, a shield braid, and an inner electrical insulation about an electrical conductor in bonded relation thereto; the improvement comprising a first plastic sleeve positioned about the inner electrical insulation and between the inner electrical insulation and the shield braid in bonded relation to the inner electrical insulation, said first plastic sleeve and shield braid having exposed end portions, and a second plastic sleeve positioned about the outer electrical insulating braid and exposed end portions of the first plastic sleeve and the shield braid in bonded relation thereto so as to effect a tightly bonded terminal end for the cable to meet minimum dimensional requirements.

References Cited in the file of this patent

UNITED STATES PATENTS

| | | |
|---|---|---|
| 2,798,113 | Koller et al. | July 2, 1957 |
| 2,862,994 | Yeiser | Dec. 2, 1958 |